United States Patent
Kayhart (10) Patent No.: US 9,404,665 B1
(45) Date of Patent: Aug. 2, 2016

(54) RADIANT PANEL SYSTEM HAVING INCREASED EFFICIENCY

(75) Inventor: Paul Kayhart, Loyal, WI (US)

(73) Assignee: Khart Panels LLC, Loyal, WI (US)

( * ) Notice: Subject to any disclaimer, the term of this patent is extended or adjusted under 35 U.S.C. 154(b) by 336 days.

(21) Appl. No.: 13/220,924

(22) Filed: Aug. 30, 2011

Related U.S. Application Data (60) Provisional application No. 61/378,026, filed on Aug. 30, 2010.

(51) Int. Cl.
| | |
|---|---|
| A45D 20/40 | (2006.01) |
| F24C 7/00 | (2006.01) |
| F26B 3/30 | (2006.01) |
| H05B 1/00 | (2006.01) |
| H05B 3/00 | (2006.01) |
| H05B 11/00 | (2006.01) |
| F24D 19/02 | (2006.01) |
| F24H 9/06 | (2006.01) |
| F24D 3/16 | (2006.01) |
| F24D 3/12 | (2006.01) |
| F24D 3/14 | (2006.01) |

(52) U.S. Cl.
CPC .. *F24D 3/12* (2013.01); *F24D 3/14* (2013.01); *F24D 3/146* (2013.01); *F24D 3/148* (2013.01); *F24D 3/16* (2013.01)

(58) Field of Classification Search
CPC .............. E04F 19/06; F28F 1/20; F24D 3/12; F24D 3/14; F24D 3/16; F24D 3/142; F24D 3/146; F24D 3/148; F24F 5/0089
USPC .......... 392/407; 219/200, 201, 212, 213, 520, 219/523, 530, 532, 538, 539, 544; 165/48.1, 49, 56
See application file for complete search history.

(56) References Cited

U.S. PATENT DOCUMENTS

| | | |
|---|---|---|
| 4,326,366 A | 4/1982 | Werner |
| 4,646,814 A | 3/1987 | Fennesz |
| 5,022,459 A * | 6/1991 | Chiles et al. ................ 165/11.1 |
| 5,788,152 A | 8/1998 | Alsberg |
| 5,957,378 A | 9/1999 | Fiedrich |
| 6,220,523 B1 | 4/2001 | Fiedrich |
| 6,283,382 B1 | 9/2001 | Fitzemeyer |
| 6,533,185 B1 | 3/2003 | Muir |
| 6,805,298 B1 | 10/2004 | Corbett |
| 7,021,372 B2 | 4/2006 | Pickard |
| 2003/0218075 A1 | 11/2003 | Muir |

(Continued)

OTHER PUBLICATIONS pexheat.com, FLexPlate, as viewed at http://www.pexheat.com/FLEXPLATE on Aug. 24, 2010. 1 page.

(Continued)

*Primary Examiner* — Dana Ross
*Assistant Examiner* — Lindsey C Teaters
(74) *Attorney, Agent, or Firm* — Brannen Law Office, LLC; Nicholas A. Brannen (57) ABSTRACT

The present invention in some embodiments can utilize a board for retaining a tube within a region. The board (or boards) and region can have many configurations. A transfer layer having a graphite layer can be applied and/or bonded to the board. A metal or non-metal layer can be bonded to the graphite layer as part of the transfer layer. The present invention takes advantage of the principles of heat transfer to produce a more effective and efficient system and methods of use.

33 Claims, 4 Drawing Sheets

(56) References Cited

U.S. PATENT DOCUMENTS

| | | |
|---|---|---|
| 2004/0040693 A1 | 3/2004 | Fiedrich |
| 2006/0144578 A1 | 7/2006 | Fiedrich |
| 2006/0272796 A1* | 12/2006 | Asmussen ............... F28F 13/18 165/53 |
| 2009/0101306 A1 | 4/2009 | Reis et al. |
| 2010/0243230 A1* | 9/2010 | Chen et al. .................... 165/185 |
| 2010/0314081 A1* | 12/2010 | Reis .......................... F24J 2/07 165/134.1 |
| 2010/0314278 A1* | 12/2010 | Fonteyne ................ B32B 27/08 206/469 |
| 2011/0290445 A1* | 12/2011 | Shelef et al. ...................... 165/6 |

OTHER PUBLICATIONS

Graftech International, Grafihx, as viewed at http://www.graftechaet.com/GRAFIHX//GRAFIXH-Home.aspx on Aug. 24, 2010. 1 page.

Warmboard, Warmboard, as viewed at http://www.warmboard.com/explained.html and http://www.warmboard.com/images/presspagelarge.jpg on Mar. 6, 2007. 4 pages total.

* cited by examiner

RADIANT PANEL SYSTEM HAVING INCREASED EFFICIENCY

This United States utility patent application claims priority on and the benefit of provisional application 61/378,026 filed Aug. 30, 2010, the entire contents of which are hereby incorporated herein by reference.

BACKGROUND OF THE INVENTION

1. Field of the Invention

The present invention relates to a radiant floor heating system having channels for receiving tubing wherein a layer having rapid planar heat dissipation and reduced pass-through heat dissipation is provided.

2. Description of the Related Art

One common home heating method includes the use of forced-air furnaces. While these systems work well for their intended purposes, their use is not without some limitations. Forced-air systems work by distributing heated air into desired rooms. The heat has a tendency to quickly rise towards the ceiling, which is inefficient. Rooms, particularly those with tile or slate flooring, may feel cold. Rooms with hard wood flooring may also feel cold. Homeowners and occupants may have reduced enjoyment of rooms with these types of flooring during the winter months when their home is heated with a forced air system.

In contrast, many homes can be constructed with radiant in-floor heating. Benefits of the in-floor heating in the winter months are well known, and include the comfortable use and enjoyment of rooms with natural flooring or other types of solid flooring. This is traditionally accomplished by locating tubing in the floor when pouring the concrete sub-floor. One drawback of this type of installation is that any punctures or leaks in the tubing can be difficult and costly to fix. Also, this type of installation is only practical for a new construction. It is not practical to install this type of system when remodeling a home. Several inches of concrete may be necessary, and the room may not be able to accommodate the required thickness of the concrete. Also, use of several inches of concrete is impractical for use in all levels but the bottom level of a home due to the weight of the concrete. A further drawback of recessing the tubing in concrete is the built-in inefficiency of allowing some heat pass to the ground below the concrete. This is due to the lack of insulation below the concrete.

A product having the name Warmboard exists utilizing panel type sub-flooring. Caulk or another type of adhesive is necessary to hold the tubes in place. It can be difficult to remove adhesively secured tubes if they are in need of repair or replacement. Further, the caulk and adhesive can interfere with the transfer of heat from the fluid within the tube to the floor.

Another system in use utilizes a tube mounted to the underside of a sub-floor between the joists. Insulation is then placed below the tube and between the joists so that the heat dissipated from the tube rises through the sub-floor instead of into the room below. It is impractical to install this type of system during a remodeling job when the room below the room where the heating system is being installed is a finished room. This is because the finished ceiling will impair access to the joists.

U.S. Pat. No. 4,326,366 to Werner is entitled Support Plate for Guiding Heating Pipes of a Floor or Wall Heating System. Looking particularly to FIG. 3 of the Werner patent, it is seen that this patent discloses a heat conducting layer, and a recess that forms part of a circle.

U.S. Pat. No. 4,646,814 to Fennesz discloses a system for tempering a room. This system has duct for allowing air to pass through the system.

U.S. Pat. No. 5,788,152 to Alsberg shows a floor heating system. The system has panels overlaid with a heat conducting surface embossed with a matching groove pattern. The panels have structural characteristics of a subflooring panel. FIG. 3 shows a modular panel.

U.S. Pat. No. 5,957,378 to Fiedrich is entitled Radiant Floor and Wall Hydronic Heating Systems. This patent shows a plate for holding a tube in intimate thermal contact so that the plate is heated by conduction. The plate has a radiating surface that radiates the heat to an area. U.S. Pat. No. 6,220,523 also to Fiedrich is entitled For Radiant Floor, Wall and Ceiling Hydronic Heating and/or Cooling Systems Using Metal Plates that are Heated or Cooled by Attached Tubing that is Fed Hot or Cold Water, Techniques of Improving Performance and Avoiding Condensation when Cooling. A thermal barrier is provided between the panels and the finished floor to prevent "hot spots". U.S. Pat. No. 6,330,980 further to Fiedrich in entitled Dry Installation of a Radiant Floor or Wall Hydronic Heating System, Metal Radiating Plates that Attach to the Edges of Side-By-Side Boards and Provide Metal Slots for Holding Hot Water Tubing. The metal plate is shown to be in two separate pieces that are attached to edges of spaced apart boards. The metal plates combine to hold the tubing.

U.S. Pat. No. 6,283,382 to Fitzemeyer shows a radiant heating system pipe mounting plate. The plate is disclosed to be a flat sheet with a groove in the upper surface. A pipe is retained in the groove by a ridge running the length of the groove so that the pipe can be snapped into the groove. A top is also shown for making a flat surface.

U.S. Pat. No. 6,533,185 and pending application with publication number 2003/0218075 to Muir shows a thermal heating board comprising a nonstructural board with a recess. A pipe can be located within the recess. A film or metal can also be provided.

U.S. Pat. No. 6,805,298 to Corbett, entitled Modular Cementitous Thermal Panels for Radiant Heating, shows panels made of Portland cement or other curable cement.

U.S. Pat. No. 7,021,372 to Pickard shows a heat tubing receptacle for tightly gripping the heat tubing. Sheet metal heat transfer plates may be attached to the tubing receptacle.

Pending application with publication number 2004/0040693 to Fiedrich shows forming a metal sheet in a unitary fashion by folding it longitudinally to provide protuberances of double thickness for holding tubing. Pending application with publication number 2006/0144578 also to Fiedrich shows modular panels having special purpose bus tracks for routing tubing.

One drawback generally of using tubes to conduct a heated medium such as fluid below a finished floor is that the flooring can have hot spots directly above the tubing, termed hot stripping, and cooler spots between two runs of tube.

To overcome this deficiency, some of the inventions in the above patents utilize sheets, plates or foils of metal such as aluminum to conduct the heat over a wider area. Yet, the metal, being conductive in all directions, is still susceptible to heat stripping. Heat stripping occurs as the heat rises to the floor faster than it is conducted to the outer reaches of area between tubes. Hence, the heat may be full transferred to the floor in a limited area.

None of the above-patents show structures or methods to rapidly deploy heat over a larger area.

GrafTech Internatinal produces a product called Grafihx Flexible Heat Transfer Plates which appear to be sheets of graphite which is available in rolls and sheets.

United States Published Application 2006/0272796 to Asmussen et al. is titled Flexible Graphite Flooring Heat Spreader. It shows a heat spreader having a layer of flexible graphite material.

United States Published Application 2009/0101306 to Reis et al. is titled Heat Exchanger System. It shows a heat exchanger system, especially for a room, including a thermal element comprising a surface; a heat spreader comprising at least one sheet of compressed particles of exfoliated graphite having a density of at least about 0.6 g/cc and a thickness of less than about 10 mm, and further comprising a first side and a second side, wherein the heat spreader is positioned relative to the thermal element such that the heat spreader is at least partially wrapped around the thermal element so that the first side of the heat spreader is in a thermal transfer relationship with a portion of the thermal element surface.

While each of these last three references may work well for their intended purposes, the each nevertheless can be improved upon.

For example, none of these references show a thermal transfer element having a protective layer on top of the graphite layer. In this regard, the graphite layer in these references may be subject to damage during the installation process.

Further, none of these references show the use of a metallic layer on top of the graphite layer to draw the heat or cold from the graphite layer and transfer it to the floor above the thermal transfer layer.

Still further, none of these references show the use of an insulative layer directly below the graphite layer to mitigate thermal loss below the graphite layer.

Thus there exists a need for a radiant floor heating system and methods of use that solves these and other problems.

SUMMARY OF THE INVENTION

The present invention in some embodiments can utilize a board for retaining a tube within a region. The board (or boards) and region can have many configurations. A transfer layer having a graphite layer can be applied and/or bonded to the board. A metal or non-metal layer can be bonded to the graphite layer as part of the transfer layer. The present invention takes advantage of the principles of heat transfer to produce a more effective and efficient system and methods of use.

According to one advantage of the present invention, the graphite layer rapidly distributes the heat away from the pipe containing the heated fluid to maximize heat transfer.

According to another advantage of the present invention, the floor is more evenly heated. This results because the graphite can move the heat away from the pipe faster than the metal layer can conduct it to the flooring. This results in a larger area on the floor with a higher initial temperature differential between the aluminum (wider area rapidly heated) and the floor (fixed area), thereby reducing heat stripping.

According to another advantage of the present invention, heat loss to the surrounding environment is reduced, as the graphite layer is highly conductive along its plane and somewhat insulative by comparison in a direction perpendicular to the planar direction. The metal layer acts as a thermal collector to conduct the heat to the floor faster than the heat is conducted to the underside of the graphite, resulting in reduced heat loss.

Because of the increase in efficiency, the floor can warm faster which results in lower overall energy requirements to accomplish the heat transfer. Hence, the system is subject to reduced operational expenses.

According to another advantage of the present invention, the metal layer protects the graphite layer, which can be more fragile than the metal layer.

In another embodiment, a non-metal layer can be bonded or applied over the graphite layer to protect the graphite layer during installation of the flooring.

In yet another embodiment, an insulative layer can be applied directly below the graphite layer to mitigate thermal loss away from the finished flooring.

Other advantages, benefits, and features of the present invention will become apparent to those skilled in the art upon reading the detailed description of the invention and studying the drawings.

DETAILED DESCRIPTION OF PREFERRED EMBODIMENTS

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Figure 1:
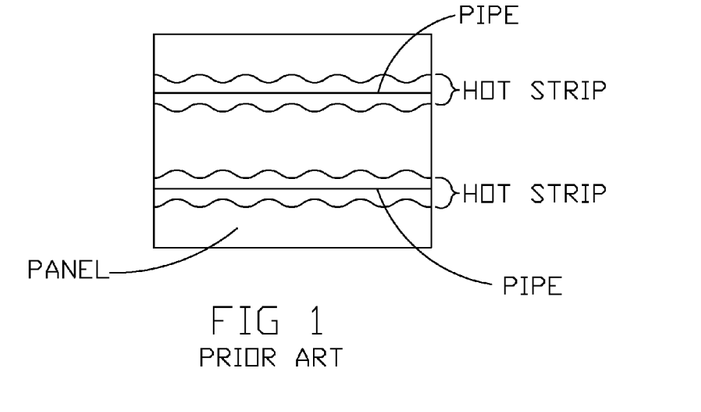
FIG. 1 is top view of a background system.

Turning now to FIG. 1, it is seen that in the prior art, heat stripping can be problematic. Heat stripping is encountered when the thermal transfer occurs vertically to the floor faster than the thermal energy can radiate laterally away from the thermal elements resulting in uneven heating or cooling across the floor.

Figure 2:
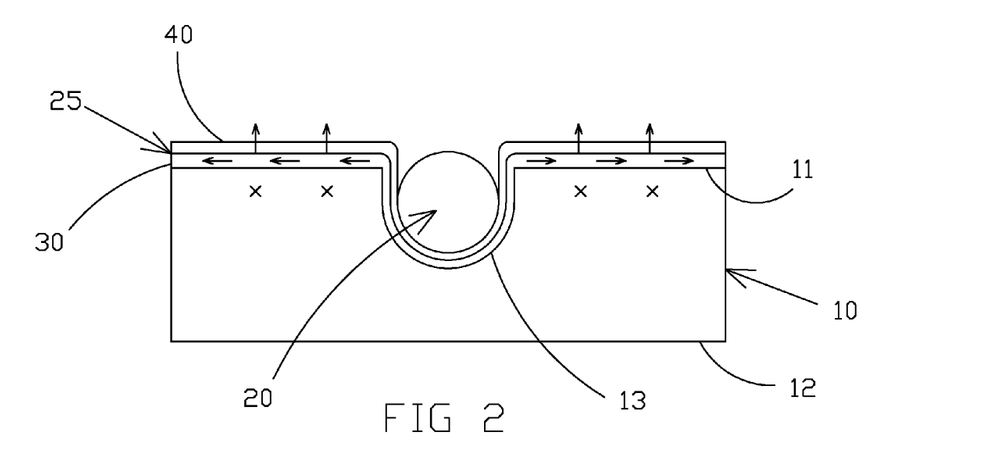
FIG. 2 is a side view of a preferred embodiment of the present invention.
Figure 3:
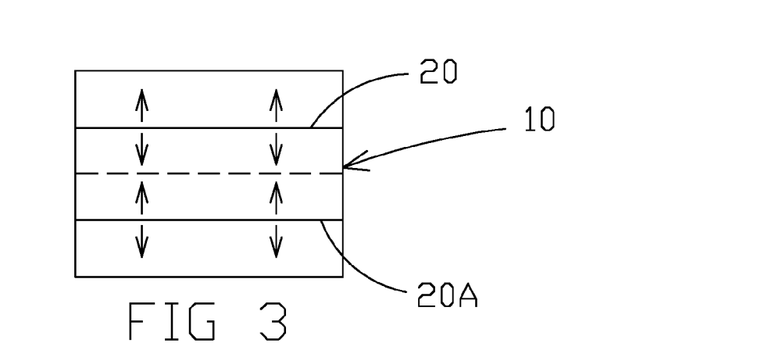
FIG. 3 is a top view of a preferred embodiment showing increased heat transfer.

Turning now to FIGS. 2 and 3, it is seen that a preferred embodiment of the present invention is illustrated. A board or panel 10 having a top 11 and a bottom 12 is provided. The board 10 further has a channel 13 formed therein for receiving one or more thermal elements 20 and 20A, respectively. It is understood that while a pipe or tube is illustrated, that a wire or other thermal element can be provided without departing from the broad aspects of the present invention.

It is appreciated that while one configuration of a board and channel is illustrated, that the present invention is in no way limited to such a configuration.

A transfer element 25 is further provided for being in close proximity to the thermal element 20. In one preferred embodiment, the transfer element 25 has a graphite layer 30 and a metal layer 40. As seen in FIG. 4A, a bonding layer 35 can be between the graphite layer 30 and metal layer 40, and an adhesive layer 45 can be provided for bonding the graphite layer to a substrate such as a panel 10. The adhesive layer 45 can optionally have a peel-off backing.

The graphite layer 30 can have a preferred thickness of between 0.005 inches and 1.000 inch, and preferably is about 0.010 inch thick, and can be formed in one of many manufacturing processes. It is preferred but not necessary that the graphite is pure in nature without binders or fillers. The graphite layer preferably has a thermo-conductivity in the range of between 5 to 400 W/MK, and more preferably about 250 W/MK. It is understood that the graphite layer can alternatively be a mixture of graphite with either metals or non-metals. The graphite layer 30 is preferably highly thermally conductive in the planar direction. The planar direction is along the plane of the graphite. Due to the thermal properties of the graphite layer 30, it has a relatively low thermal conductivity perpendicular to the planar direction. In use, the graphite layer spreads heat rapidly in the planar direction, and is insulative perpendicular to the planar direction. The graphite layer 30 can be continuously formed within the channel, or slitted and pressed into the channel. It is appreciated that the graphite layer can be formed in a multitude of ways relative the board, and the present invention is not limited to any such configuration.

The metal layer 40 can be bonded to, adhered to, pressed into or otherwise be adjacent to the graphite layer 30. It is preferred in one embodiment that bonding layer 35 continuously bond the metal layer 40 to the graphite layer 30. The metal layer can be a foil, a sheet, a plate or any other physical size. One preferred metal layer is aluminum. The aluminum can have a have a preferred thickness of between 0.0001 inches and 0.5 inch, and preferably is about 0.005 inch thick, and can be formed in one of many manufacturing processes. However, it is appreciated that other metals or even other non-metallic materials having high conductivity through the plane of the material may be used without departing from the broad aspects of the present invention. In this regard, the metal layer 40 can more broadly be called a through-plane conductive layer.

In use, the graphite rapidly dissipates heat (or coolness) from the pipe and radiates it out from the pipe in the planar direction. The graphite layer 40 effectively conducts the heat so fast that heat stripping is greatly reduced. The metal layer 40 acts as a thermal collector to conduct the heat to the floor. Since the graphite layer widely distributed the heat, the entire surface area of the metal layer has a more uniform temperature differential between the graphite layer and the floor. It is also appreciated that the metal layer 40 acts as a thermal collector to transfer the heat to the floor faster than the heat could be conducted through the graphite layer to the underside of the graphite layer.

The metal layer 40 can provide structural support to the system, and also prevents tearing or ripping of the graphite layer 30. The graphite layer can be particularly susceptible to tearing or ripping at the channels. The metal layer 40 accepts the majority of the wear and tear due to inserting the piping into the channels.

Figure 4:
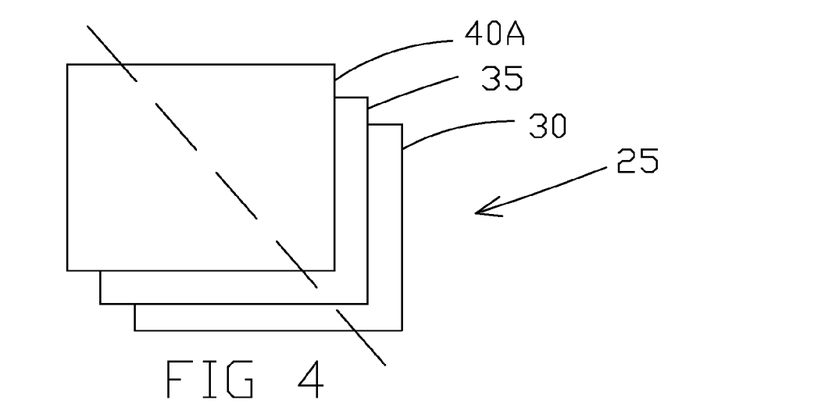
FIG. 4 is an exploded view showing several layers of a preferred thermal transfer element.
Figure 4A:
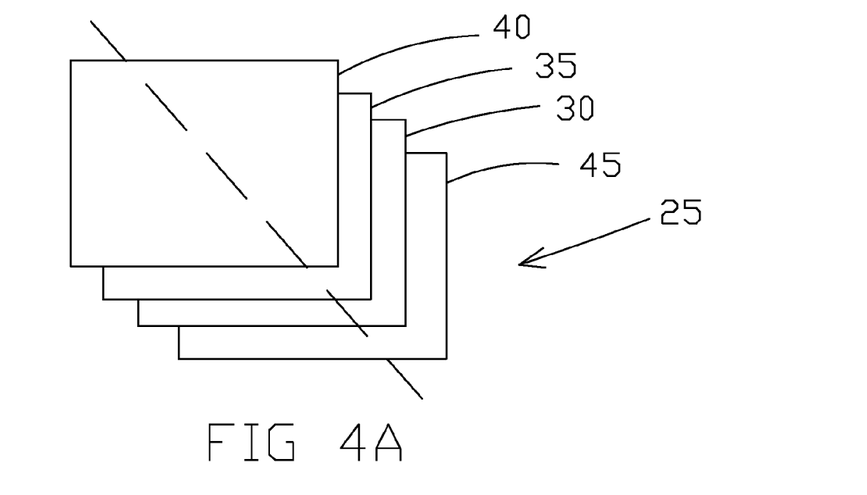
FIG. 4A is an exploded view showing several layers of an alternative thermal transfer element.

Turning now to FIG. 4, it is seen that an alternative embodiment is illustrated. In this regard, a graphite layer 30 is provided and bonded to a non-metal layer 40A. Layer 40A can be a protective layer that protects the integrity of the graphite layer 30 during installation. For example, the protective layer 40A may allow an installer to walk on the transfer element without causing the transfer element to tear, rip or flake. Also, the protective layer 40A can maintain the integrity of the graphite layer 30 during the installation of the heat elements. It is preferred that the protective layer 40A have a preferred thickness of between 0.0001 inches and 0.5 inch, and preferably is about 0.005 inch thick, and can be formed in one of many manufacturing processes. One preferred protective layer is Mylar plastic. However, other materials may be used without departing from the broad aspects of the present invention.

It is understood that multiple layers (thermal, protective and/or through-plane conductive) may be used without departing from the broad aspects of the present invention.

Figure 5:
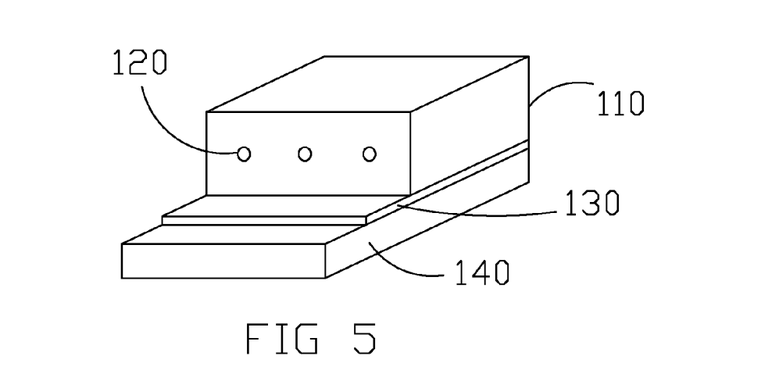
FIG. 5 is a view showing s transfer element, an insulating layer and a thermal element that is embedded in concrete.

Looking now at FIG. 5, it is seen that an additional preferred embodiment is illustrated. In this embodiment, several thermal elements 120 are embedded within concrete 110. A transfer layer having a graphite layer 130 is provided directly underlying the concrete 110. The transfer layer allows thermal energy to radiate across the plane of the graphite 130. An insulating layer 140 is provided and is preferably directly underneath the graphite layer 130. The insulative layer 140 can be made of foam, fiberglass, polystyrene or other suitable material. The insulative layer 140 prevents the thermal energy from dissipating to the ground below. In this regard, the thermal energy is encouraged to pass through and spread evenly within the concrete layer 110.

Figure 6:
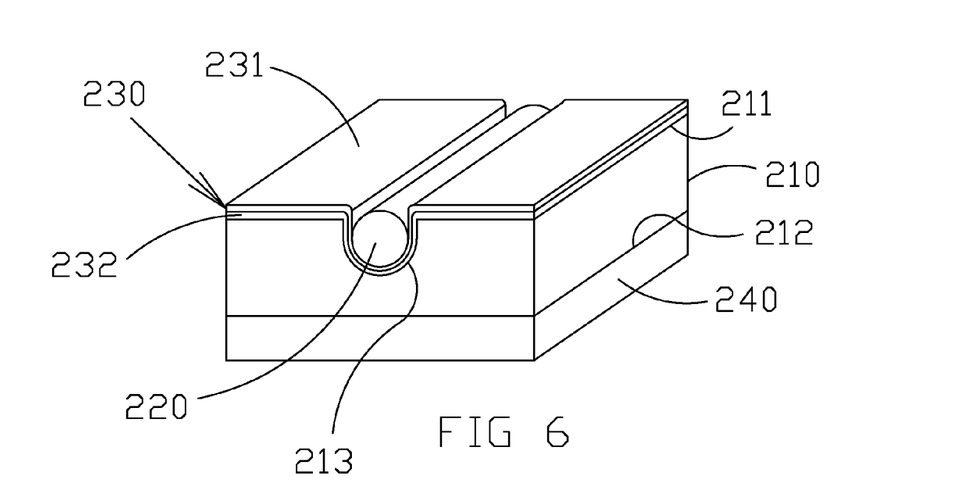
FIG. 6 is a perspective view of an alternative embodiment of the present invention.

Looking now at FIG. 6, it is seen that another preferred embodiment is illustrated. A panel 210 is provided having a top 211 and a bottom 212. A channel or region 213 is provided within the panel 210. The channel is preferably open to the top 212, and passes more than ½ way but not all the way through the panel 210. The channel 213 is sized to receive a thermal element 220. A transfer element 230 is also provided. The transfer element 230 has a graphite layer 232 and a cover 231. The cover 231 can be a protective layer or a through-plane conductive layer. It is appreciated that a through-plane conductive layer can also function as a protective layer allowing an installer to move about without damaging the graphite layer 232.

Panel 210 is preferably an insulative panel having an R-value above that of a typical subfloor panel (1.5 is a typical R-value for a sub-floor). In this regard, the panel preferably has an R-value above 1.5 per inch of thickness of the panel. The panel 210 can be installed directly on a sub-floor 240.

Figure 7:
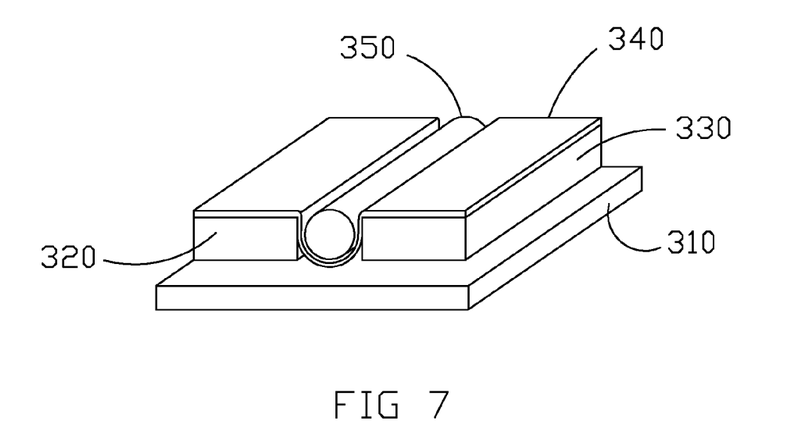
FIG. 7 is a perspective view of an alternative embodiment of the present invention having side by side panels with a thermal transfer unit above the panels.

Turning now to FIG. 7, it is seen that yet another embodiment is illustrated. This embodiment is similar to previous embodiments, but shows the use of two panels 320 and 330 to define a gap 335 for retaining a heat element 350. A subfloor 310 is provided and the panels can be applied to the subfloor leaving a gap of an appropriate size to retain a thermal element. A transfer element 340 is provided to transfer the thermal energy from the thermal element. The panels 320 and 330 can be insulative panels.

Figure 8:
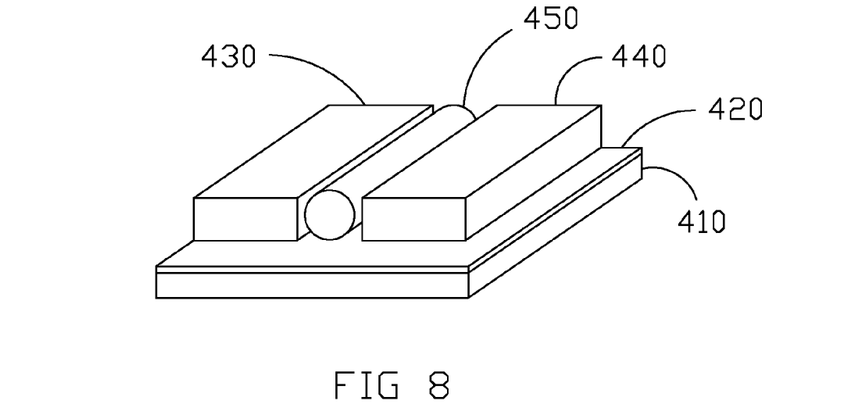
FIG. 8 is a perspective view of an alternative embodiment of the present invention having side by side panels with a thermal transfer unit below the panels.

Now looking at FIG. 8, it is seen that an additional embodiment is provided. In this embodiment, a subfloor 410 is provided. A transfer layer 420 is applied directly to the subfloor 410. The transfer layer has a graphite layer and may optionally have a protective layer over the graphite layer. Panels 430 and 440 are placed over the transfer layer. The panels preferably do not have enhanced insulative properties in this embodiment, wherein the thermal energy can readily pass through the panels.

Figure 9:
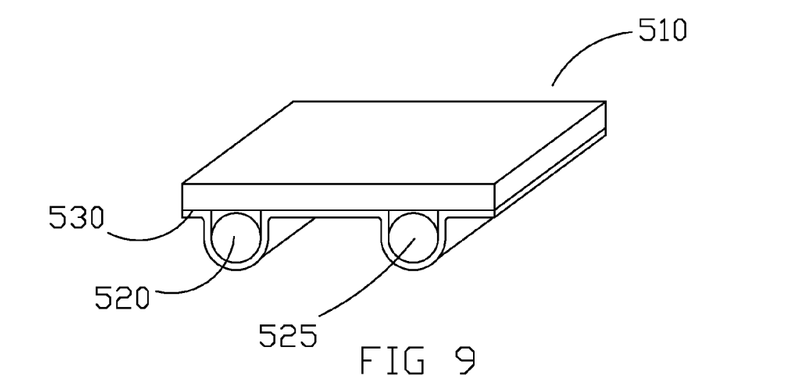
FIG. 9 is a perspective view of an alternative embodiment of the present invention showing a transfer element wrapping thermal elements below a panel.

It is also appreciated that the graphite layer and metal layer can be installed under the floor (for example between floor joists) without departing from the broad aspects of the present invention. Looking now at FIG. 9, it is seen that yet another embodiment is illustrated. A panel 510 is provided which can be a subfloor spanning between floor joists. Heat elements 520 and 525 can be provided and wrapped in a transfer element 530. The transfer element can then be secured to the underside of the panel 510 to spread thermal energy across the panel 510.

While several embodiments are illustrated above in relation to heating or cooling floors, it is understood that the principles of the present invention can likewise be applied to walls and ceilings without departing from the broad aspects of the present invention.

Thus it is apparent that there has been provided, in accordance with the invention, a radiant floor heating system and methods of use that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A radiant system comprising:
   a panel with a channel;
   a thermal element; and
   a transfer element being in proximity to said thermal element to distribute thermal energy from said thermal element comprising:
      a graphite layer, said graphite layer having an upper surface; and
      a protection layer above said graphite layer, said protection layer being pressed together with and continuously bonded with the entirety of said upper surface of said graphite layer,
   wherein:
      said protection layer is formed between said graphite layer and said thermal element, and
      said graphite layer and said protection layer are formed into said channel and said graphite layer and said protection layer both extend from said channel;
      said thermal element is insertable into said channel above said protection layer and said graphite layer; and
      said protection layer protects the integrity of said graphite layer when said thermal element is being inserted into said channel.

2. The radiant system of claim 1 wherein said transfer element further comprises an adhesive layer for bonding said transfer element to at least one panel.

3. The radiant system of claim 1 wherein said graphite layer is between 0.005 and 1.000 inch thick.

4. The radiant system of claim 3 wherein said graphite layer is approximately 0.01 inch thick.

5. The radiant system of claim 1 wherein said protection layer is a metal layer.

6. The radiant system of claim 1 wherein said protection layer is a non-metal layer.

7. The radiant system of claim 1 further comprising at least one insulative panel having an R-value that is greater than 1.5 per inch thickness of said at least one panel.

8. A radiant system comprising:
   a thermal element; and
   a transfer element being in proximity to said thermal element to distribute thermal energy from said thermal element comprising:
      a graphite layer, said graphite layer having an upper surface; and
      a protection layer above said graphite layer, said protection layer being pressed together with and continuously bonded with the entirety of said upper surface of said graphite layer,
   wherein:
      said protection layer is formed between said graphite layer and said thermal element, and
      said protection layer protects the integrity of said graphite without causing the graphite layer to tear, rip or flake.

9. The radiant system of claim 8 wherein said thermal element is a heating element or a cooling element.

10. The radiant system of claim 8 wherein said thermal element is manufactured in the form of a plate, sheet or foil.

11. The radiant system of claim 8 wherein said thermal element is a wire or a tube or a pipe.

12. The radiant system of claim 8 further comprising an insulative layer below or above said transfer element.

13. The radiant system of claim 12 wherein said insulative layer is a foam, fiberglass or polystyrene layer.

14. The radiant system of claim 8 wherein said protection layer is a metal or non-metal layer.

15. The radiant system of claim 8 wherein said protection layer is an aluminum layer.

16. The radiant system of claim 8 wherein said protection layer is a plastic layer.

17. The radiant system of claim 8 wherein said transfer element is applied to floors, ceilings or walls.

18. The radiant system of claim 8 wherein said transfer element is provided directly underlying concrete.

19. The radiant system of claim 8 wherein said thermal element is a heating element or a cooling element.

20. A radiant system comprising:
   a thermal element; and
   a transfer element being in proximity to said thermal element to distribute thermal energy from said thermal element comprising:
      a graphite layer, and
      a protection layer,
   wherein:
      said protection layer is formed between said graphite layer and said thermal element, and
      said protection layer protects the integrity of said graphite without causing the graphite layer to tear, rip or flake.

21. The radiant system of claim 20 wherein said graphite layer is pure in nature without binders or fillers.

22. The radiant system of claim 20 wherein said graphite layer is a mixture of metals or non-metals.

23. The radiant system of claim 20 wherein said graphite layer has a thermo-conductivity in the range of 5-400 W/MK.

24. The radiant system of claim 23 wherein said graphite layer has a thermo-conductivity of approximately 250 W/MK.

25. The radiant system of claim 20 wherein said transfer layer is adjacent to a metal or non-metal layer.

26. The radiant system of claim 20 wherein said transfer element is manufactured in well the form of a plate, sheet or foil.

27. The radiant system of claim 20 wherein said graphite layer is manufactured in the form of a plate, sheet, or foil.

28. The radiant system of claim 20 wherein said protection layer is manufactured in the form of a plate, sheet or foil.

29. The radiant system of claim 20 wherein said protection layer is a metal or non-metal layer.

30. The radiant system of claim 29 wherein said non-metal layer is a plastic layer.

31. The radiant system of claim 30 wherein said plastic layer is Mylar.

32. The radiant system of claim 20 wherein said transfer element is applied to floors, ceilings or walls.

33. The radiant system of claim 20 further comprising an insulative layer below or above said transfer element.

\* \* \* \* \*